March 4, 1941. J. H. ASHBAUGH 2,233,394
REFRIGERATION APPARATUS
Filed Oct. 26, 1939

INVENTOR
JOHN H. ASHBAUGH
BY
ATTORNEY

Patented Mar. 4, 1941

2,233,394

UNITED STATES PATENT OFFICE 2,233,394

REFRIGERATION APPARATUS

John H. Ashbaugh, Springfield, Mass., assignor to Westinghouse Electric & Manufacturing Company, East Pittsburgh, Pa., a corporation of Pennsylvania Application October 26, 1939, Serial No. 301,354

5 Claims. (Cl. 62—89)

My invention relates to refrigeration apparatus and particularly refrigeration apparatus including a high humidity compartment for preserving foodstuffs which may be spoiled by dehydration.

It is an object of my invention to provide a refrigerator with a high humidity compartment in which the moisture contained in the compartment is controlled.

It is another object of my invention to prevent dripping of moisture on the foodstuffs contained in the high humidity compartment of a refrigerator.

It is a further object of my invention to provide a high humidity chamber in a refrigerator which is cooled primarily by conduction of heat through the walls of the chamber and wherein moisture which collects inside of the chamber may be conveyed into the stream of dry air surrounding the high humidity chamber.

These and other objects are effected by my invention as will be apparent from the following description and claims taken in connection with the accompanying drawing forming a part of this application, in which:

Figure 1:
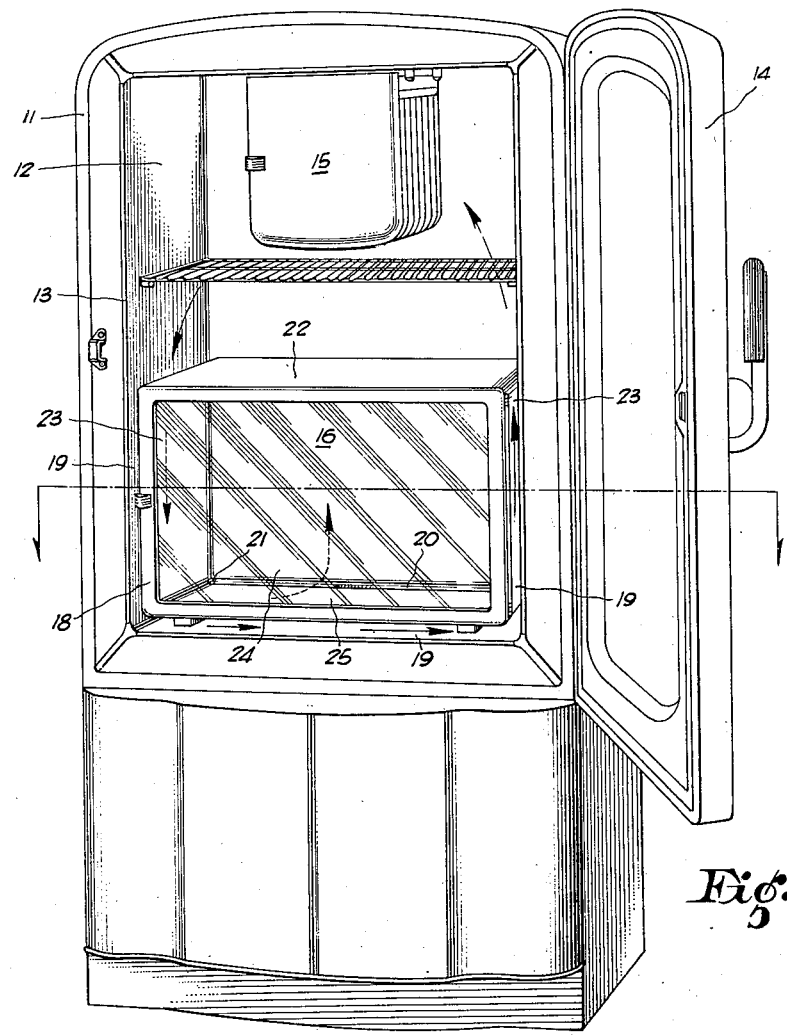
Fig. 1 is a perspective view of a refrigerator embodying my invention.
Figure 2:
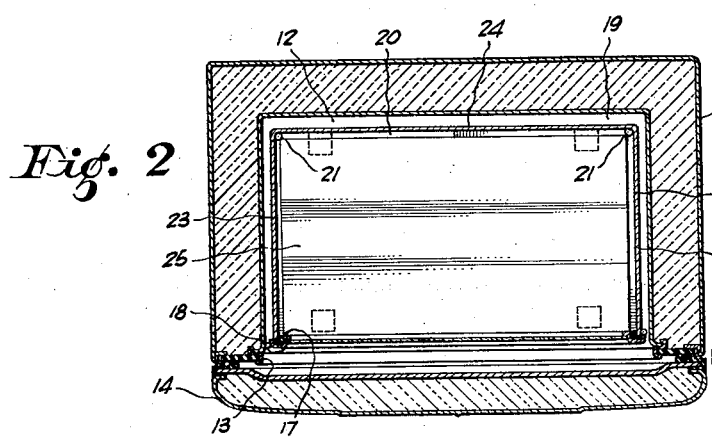
Fig. 2 is a sectional view taken on line II—II of Fig. 1.

Referring specifically to the drawing for a detail description of my invention, numeral 11 designates, generally, a refrigerator cabinet including a heat insulated compartment 12 having an access opening 13 and a main insulated door 14 for enclosing the access opening 13. A cooling element or evaporator 15 of the conventional sheet metal type is disposed adjacent the top of the compartment 12 and refrigerant is circulated therethrough by any suitable refrigeration mechanism (not shown). A high humidity chamber 16 disposed beneath the evaporator 15 preferably includes a top wall 22, side walls 23, a back wall 24 and a bottom wall 25 all formed of material of good heat conductivity, for example, porcelainized carbon steel. The chamber 16 is provided with an access opening 17 registering with the main access opening 13 and with an auxiliary door 18, preferably formed of glass, for tightly sealing the access opening 17, so that the high humidity chamber 16 is substantially enclosed. The high humidity chamber 16 is spaced from the sides, bottom and back of the compartment 12, as shown at 19. A plurality of apertures 21 are provided in the bottom wall 25 of the high humidity chamber 16, and moisture collecting grooves or troughs 20 sloping toward the apertures 21 are disposed in the same vertical plan as the side and back walls of the chamber 16.

The cooling element or evaporator 15 is normally maintained at below freezing temperatures and cools and circulates the air in the compartment 12 as shown, for example, by the arrows in Fig. 1. The cooling element dehydrates the circulated air by abstracting and freezing moisture therefrom and the cooled dry air contacts the top wall 22 of the high humidity chamber 16 and is circulated through the spaces 19, thus contacting the sides, back and bottom walls of the chamber 16. The air in the high humidity chamber 16 is cooled primarily by conduction of heat through the walls thereof and because of the extended heat transfer surface which maintains the air in the chamber 16 at a temperature only slightly below the temperature of the extended surface, a relatively high humidity is maintained therein. Foodstuffs which may be spoiled by excessive dehydration, such as vegetables and foods containing moisture which are kept in open containers, may be safely preserved in the high humidity chamber 16, at refrigerated temperatures.

However, some foodstuffs are deleteriously affected by humidities which are too high and many foodstuffs are rendered inedible if moisture drips on them. Dripping may occur if the humidity in the chamber 16 becomes too high and collects on the top wall 22 thereof, where it is most likely to collect since the top wall is the coldest wall of the chamber 16, because of its proximity to the cooling element 15. In order to prevent excessive moisture from collecting in the compartment 16 and to prevent dripping of moisture on the foodstuffs, moisture which collects on the top wall 22, side walls 23 and back wall 24 of the high humidity chamber 16 runs down the side and back walls 23 and 24 into the grooves 20 and through the apertures 21 into the space 19, whereupon the dry air circulating around the high humidity chamber 16 absorbs the moisture and deposits it on the cooling element 15 which is, of course, periodically defrosted. The relative humidity in the high humidity chamber 16 may be controlled to some extent by regulating the size and number of the apertures 21, since some of the dry circulated air will pass through the chamber 16 through the apertures 21, thus absorbing moisture therefrom. If desired, in order to insure that moisture collecting on the top wall 22 is conveyed to the side walls 23 of the chamber 16 and thence to the apertures 21, the top wall may be slightly convex. It will be understood that other methods may be employed for removing moisture from the high humidity chamber 16 and depositing it on the evaporator 15, the main object being to prevent moisture in the high humidity chamber 16 from dripping on the foodstuffs contained therein.

From the foregoing it will be apparent that I have provided improved refrigeration apparatus embodying a high humidity compartment with provision for removing moisture therefrom and for preventing dripping of the moisture on the foodstuffs contained therein.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In refrigeration apparatus, the combination of a refrigerator cabinet, a relatively low temperature cooling element for abstracting heat from the air in said cabinet which circulates into contact with the cooling element, said cooling element also abstracting moisture from the air in said cabinet, a substantially enclosed chamber disposed in said cabinet in which a high humidity is maintained and embodying top, side, rear and bottom walls and an open front, and a closure for the front of said chamber, said chamber having an aperture in the bottom wall thereof for draining moisture therefrom and depositing it in the dry circulated air, said cooling element in turn extracting said moisture from said circulated air.

2. In refrigeration apparatus, the combination of a refrigerator cabinet, a relatively low temperature cooling element for abstracting heat from the air in said cabinet which circulates into contact with the cooling element, said cooling element also abstracting moisture from the air in said cabinet, a substantially enclosed chamber disposed in said cabinet in which a high humidity is maintained and embodying top, side, rear and bottom walls and an open front, a closure for the front of said chamber, and means disposed in the bottom wall of said chamber substantially in the plane of the side wall thereof for collecting moisture from the high humidity chamber and depositing it in the dry circulated air, said cooling element in turn extracting said moisture from said circulated air.

3. In refrigeration apparatus, the combination of a refrigerator cabinet, a relatively low temperature cooling element disposed near the top of said cabinet for abstracting heat from the air therein which circulates into contact with said cooling element, said cooling element also abstracting moisture from the air in said cabinet, a substantially enclosed chamber disposed below said cooling element in which a high humidity is maintained, said enclosed chamber embodying top, side, rear and bottom walls and being provided with a closure at the front thereof, the top wall of said chamber at times condensing moisture from the air in said chamber because of its proximity to said cooling element, and means for removing moisture condensed on said top wall and depositing it in the dry circulated air to prevent dripping of moisture from said top wall on foodstuffs contained in said chamber.

4. The combination as claimed in claim 3 wherein the moisture removing means comprises collecting means in the bottom wall of said chamber near the sides thereof to collect moisture which collects on said top wall and runs down the side and back walls of the chamber.

5. In refrigerating apparatus, the combination of a cabinet having top, bottom, side and rear walls defining a storage chamber, a cooling element for abstracting heat and moisture from the air within said storage chamber, and a structure within said chamber and defining a compartment having side walls and a substantially flat bottom wall spaced from the corresponding walls of said chamber to form therewith a passage for circulating air, said bottom wall of said structure having openings arranged therein to drain moisture condensed on the walls of said structure from said compartment and discharge the same into the path of air circulating through said passage.

JOHN H. ASHBAUGH.